June 13, 1967 W. F. ICELAND 3,325,694

CALIBRATING CIRCUIT FOR TIME DELAY APPARATUS

Filed May 3, 1963 2 Sheets-Sheet 1

INVENTOR
WILLIAM F. ICELAND
BY John W. Gaines
HIS ATTORNEY

June 13, 1967 W. F. ICELAND 3,325,694

CALIBRATING CIRCUIT FOR TIME DELAY APPARATUS

Filed May 3, 1963 2 Sheets-Sheet 2

INVENTOR
WILLIAM F. ICELAND
BY John W. Gaines
HIS ATTORNEY 3,325,694

CALIBRATING CIRCUIT FOR TIME DELAY APPARATUS

William F. Iceland, Metuchen, N.J., assignor to Air Reduction Company, Incorporated, New York, N.Y., a corporation of New York Filed May 3, 1963, Ser. No. 277,904
1 Claim. (Cl. 317—142)

This invention relates to the calibration of electrical control devices, and more particularly to the calibration of electrically controllable time delay apparatus.

Time delay devices find many fields of use in modern day industry where precise timing for controlling various phases of some particular process is necessary. As an example, it is not uncommon in the welding art to make use of such timers to control the length of the welding period as shown in United States Patent No. 2,702,333 issued to Nelson E. Anderson on Feb. 15, 1950. For such general purposes, an electronically controlled time delay device has been shown in United States Patent No. 2,950,422 issued to Rawlins E. Purkhiser on Aug. 23, 1960.

In the Purkhiser device, the length of the time delay is determined by the product RC of a combination of a timing resistor and a timing capacitor used in the timing circuit. In the Purkhiser device it is advantageous to use a calibrated direct reading dial in the adjustable timing element to facilitate selection of any desired time delay interval within the available range. Manufacturing tolerances in circuit elements are such that an element selected at random from a group of elements of the wanted nominal value will not in general have the exact value required to give the time delay interval shown on the dial. For example, if the variable element is a rheostat, the resistance value of the rheostat will not in general be the precise value needed to give the time delay interval shown by the reading of the attached dial. It is desirable therefore that some means be provided for adjusting the time delay interval actually found in the system to make it equal to the time delay interval as read from the dial.

Furthermore, there are situations where a plurality of time delay units are embodied in a unitary device for timing successive operations, as for example in a welding apparatus for timing delay in starting the filler wire feed mechanism and delay in starting the welding skate travel after pressing the start button. Other intervals timed include a delay between the time of receipt of an error signal in a seam following device and the time at which the welding head arrives at the point in the seam to which the signal refers, as may be required when the detector for the seam follower is displaced materially ahead of the welding tool. Also, times for retracting the filler wire and for stopping the wire feed, times for purging the welding space with shielding gas both before and after a weld, crater fill time, time for retraction of the welding head, stub burnoff time, and time of shutdown at the end of a weld. Commonly as many as ten distinct delay intervals are employed, each governed by a separate time delay unit. In some cases, several or all of the time delay units may employ the same nominal value of the timing rheostat, each unit being set to a different time by setting the dial of that unit.

In accordance with the invention, all the dials may be set and the calibration means provided may be adjusted to bring the actual amount of time delay of each unit into agreement with the value shown on the dial.

The timing capacitor hereinabove mentioned operates a grid-controlled electron discharge device which is provided as part of my timing circuit. The capacitor establishes three operable states in the delay circuit, namely, an initial or reset state, a timing state, and a timed-out state.

For the foregoing purpose, the timing capacitor is controlled in a two-stage sequence wherein, first, a starting voltage is applied to the capacitor in the initial or reset state preceding the start of the measured time interval and, second, a final voltage is applied precisely at the start of the timing state. Under this sequence, the starting voltage builds or resets the capacitor to a predetermined voltage, whereafter the terminals of the capacitor are reversed. With the terminals thus reversed, the capacitor is then subjected to the opposite polarity of the final voltage, which thereupon operates to discharge the capacitor and recharge it in the opposite direction so as to assume a reverse-sense polarity to the polarity occurring originally when the starting voltage was used. The electron discharge device provided as aforesaid, is held in its cutoff or non-conductive condition by connection of its grid to the negative plate of the timing capacitor, i.e., the plate which became negative under the impressed starting voltage. Therefore, despite the electron discharge device being subsequently supplied with the rated potential gradient between its positive anode or plate and its negative cathode, the capacitor continues the negative grid bias and sustains this non-conductive condition of the device which prevails until the discharging capacitor allows the device to reach a critical grid voltage. Thereupon the device conducts to operate a utilization circuit, and at this instant the capacitor ceases its timing state and is said to be timed out.

According to this invention, I provide a timing circuit which I operate by selecting from a voltage source a starting voltage to be impressed upon the timing circuit before the start of a measured time interval, selecting a final voltage to be impressed upon the timing circuit at the start of a timing operation, and determining the end of the measured timed interval by an electron discharge device responsive to a given, substantially fixed voltage across the timing circuit, the length of the measured time interval being selected and varied despite use of a given, chargeable timing capacitor and given, capacitor charging resistors in the timing circuit.

Other features, objects and advantages will appear from the following more detailed description of an illustrative embodiment of the invention, which will now be given in conjunction with the accompanying drawings.

Figure 1:
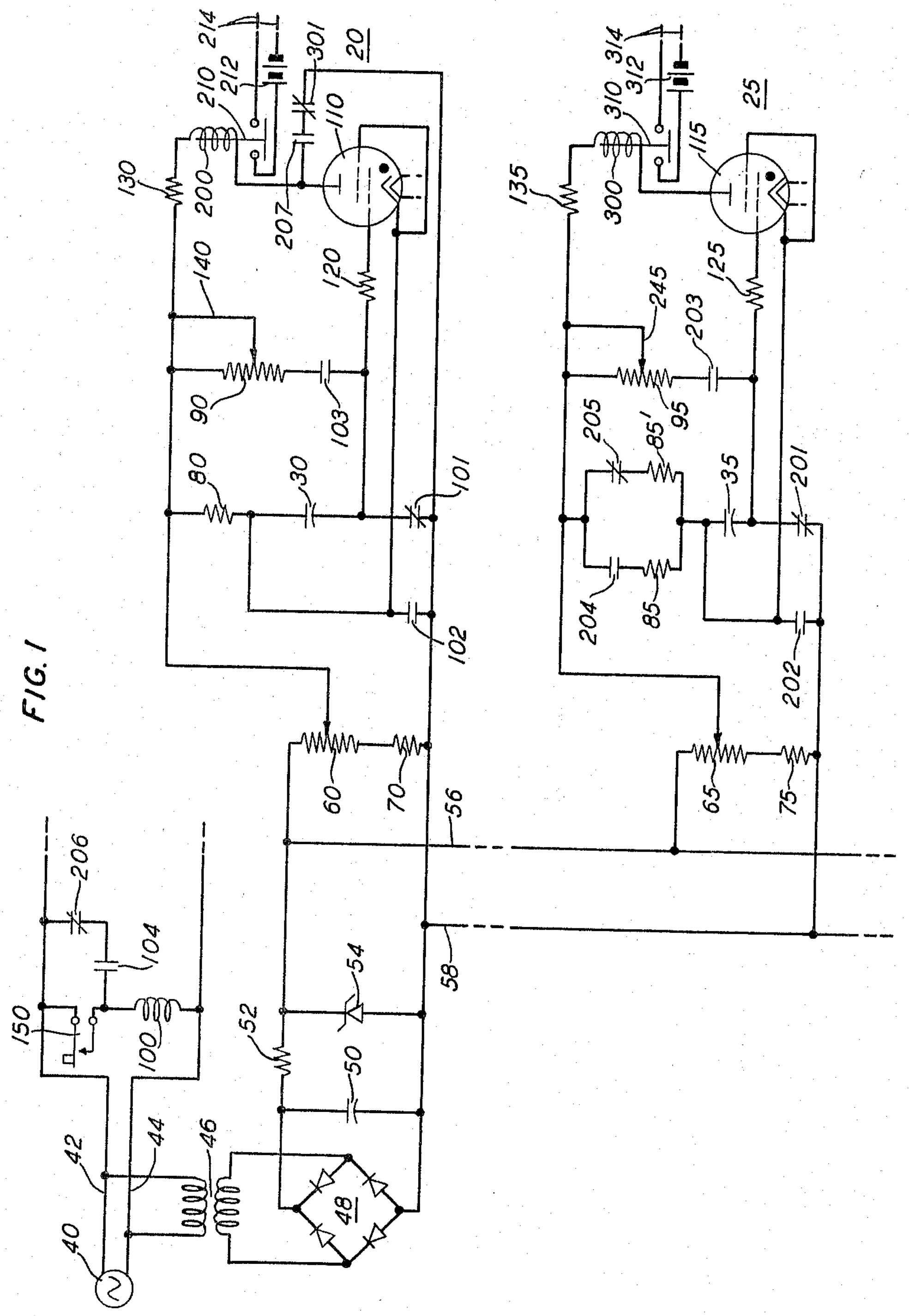
FIG. 1 is a schematic diagram of an embodiment of the invention.

Time delay units 20, 25 are shown in FIGURE 1, each of which is of the type disclosed in Purkhiser Patent No. 2,950,422, but modified in accordance with the present invention. The timing circuit for the unit 20 comprises a timing capacitor 30 and a timing rheostat 90, and the resetting circuit for the unit comprises the timing capacitor 30 and a resetting resistor 80. The timing circuit for the unit 25 comprises a timing capacitor 35 and a timing rheostat 95, while the resetting circuit comprises the timing capacitor 35 and a resetting resistor 85. The responding devices are shown as thyratrons 110, 115 with protective resistors 120, 125 in the respective grid circuits, and relay windings 200, 300 and protective resistors 130, 135 in the respective anode circuits.

The units 20, 25 are supplied with regulated direct current from a common source comprising an alternating current source 40, alternating current lines 42, 44; a transformer 46, a full wave rectifier 48, a low pass filter having a shunt capacitor 50 and a series resistor 52; a constant voltage regulator such as a zener diode 54, direct current positive supply line 56, and direct current negative supply line 58.

The modifications in the time delay circuits which distinguish the present invention from the subject matter disclosed by Purkhiser Patent No. 2,950,422 include the following. The voltage impressed upon the individual time delay unit is made adjustable. For this purpose, each time delay unit 20, 25 is provided with a potentiometer individual thereto. Time delay unit 20 is served by a potentiometer 60, and time delay unit 25 by a potentiometer 65. The total shunt resistance across the direct current lines 56, 58 at the input of the time delay unit 20 may be adjusted by inserting a resistor 70 in series with the potentiometer 60, and for the same purpose a resistor 75 may be inserted in series with the potentiometer 65. The timing resistors for the resetting operation, shown at 80 for the unit 20 and at 85 for the unit 25, are given resistance values in accordance with the present invention that bear a particular relation to the resistance values of the shunt path comprising the potentiometer and the resistor in series with the potentiometer. That is, the resistance value of the resistor 80 is related to the sum of the resistance values of the potentiometer 60 and the resistor 70. Likewise, the resistance value of the resistor 85 is related to the sum of the resistance values of the potentiometer 65 and the resistor 75. By means of these relative resistance values, whenever the potentiometer is not set at maximum, the magnitude of the voltage to which the timing capacitor is charged during the resetting operation is made to differ materially from the magnitude of the voltage to which the same capacitor is charged during the timing operation. Furthermore, by means of the said relative resistance values the voltages effective during both the resetting operation and the timing operation are made to vary as a function of the setting of the movable contactor of the potentiometer. The relative values of these voltages are found to determine the time required to charge the timing capacitor to the triggering voltage of the device which signalizes the end of the desired time delay interval. The result is that the potentiometer of any unit may be adjusted to vary the time delay interval measured by the device over a range of values determined by the time constant of the RC circuit in the unit. In this way, the actual time delay interval obtained from an RC circuit of nominal RC value may be adjusted to compensate for manufacturing tolerances of circuit components or the like to make the actual time delay interval equal to the nominal value.

Figure 2:
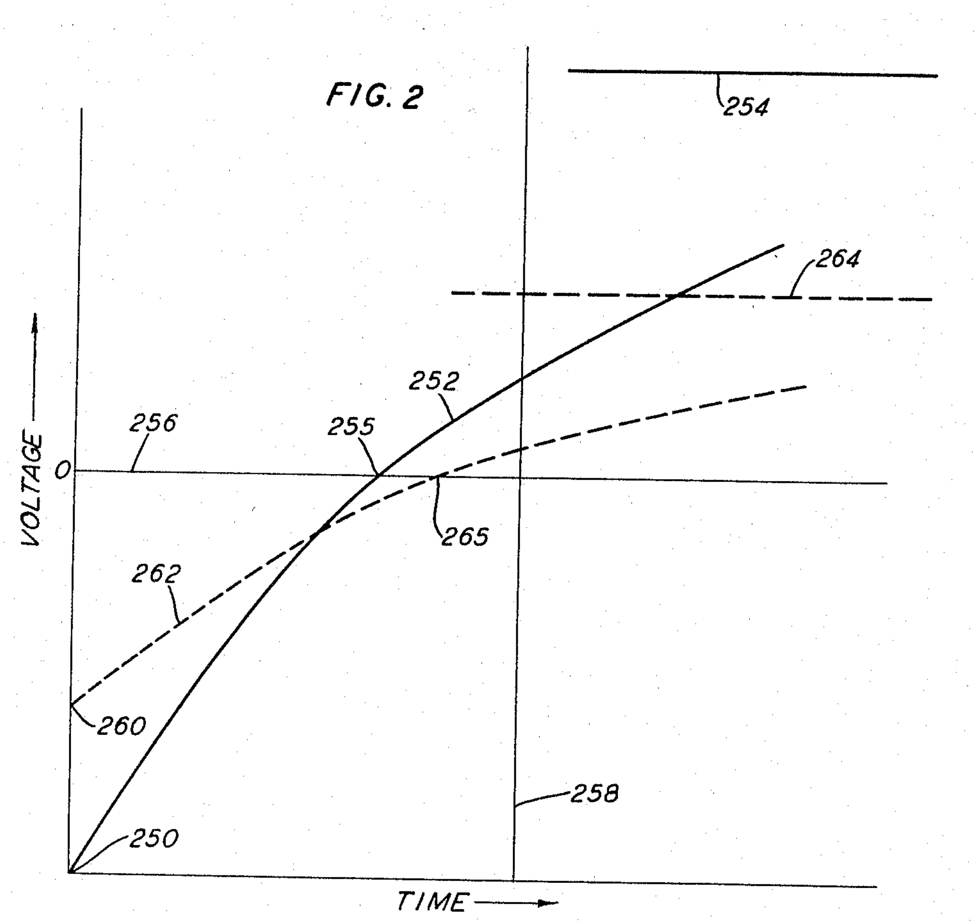
FIG. 2 is a set of graphs useful in explaining the invention.

FIG. 2 shows graphically the results of calculations of illustrative charging curves for different initial and final voltages upon the timing capacitor. The solid curve 252 is the charging curve extending between a negative initial voltage at the point 250 and an equal but positive final voltage represented by the line 254. Zero voltage, which is taken to be the triggering voltage of the thyratron, is represented by the line 256 which intersects the charging curve 252 at the point 255. The broken curve 262 is the charging curve extending between a lesser negative voltage at the point 260 and a final voltage represented by the line 264. In this case, the final positive voltage is not of the same magnitude as the negative initial voltage. The zero voltage line 256 intersects the broken curve 262 at the point 265, indicating a longer elapsed time delay than in the case of the solid curve. Both curves 252 and 262 are calculated on the basis of the same time constant value, represented by the vertical line 258. In terms of unit 20 of FIG. 1, the time delay shown by the solid curve represents the case in which the potentiometer 60 is set at the maximum resistance value while the broken curve represents a case in which the potentiometer 60 is set at a lower resistance value. The figure demonstrates how unequal time delay periods may be obtained from a timing circuit of given time constant by adjusting the calibrating potentiometer in accordance with the invention. It will be evident from the elementary theory of charging circuits that as long as the initial and final voltages are equally disposed with respect to the triggering voltage of the timer, variations in time delay are not obtainable without making a change in the time constant of the timing circuit. The invention avoids the use of equally disposed initial and final voltages, at any two or more potentiometer settings, thereby avoiding this difficulty.

The operation of a typical time delay unit in accordance with the present invention will now be described with particular reference to unit 20 in FIG. 1. In the resetting operation, with contact 101 closed and contacts 102 and 103 open, the timing capacitor 30 charges, not in general to the full voltage of the source as in Purkhiser Patent No. 2,950,422, but to a lesser voltage determined by the setting of the potentiometer 60. In the timing operation, with contact 101 open and contacts 102 and 103 closed, the timing capacitor charges, in general, again not to the full voltage of the source, but to a lesser voltage determined not alone by the setting of the potentiometer 60 but also by the relative resistance values in the series-parallel circuit comprising the potentiometer 60, the resistor 70 and the resetting resistor 80. The result is that in the timing operation, the initial voltage on the timing capacitor 30 which is the terminal voltage in the resetting operation depends upon the setting of the potentiometer 60. Also, in the timing operation, the terminal voltage on the timing capacitor 30, which is the initial voltage in the resetting operation, is dependent upon the setting of the potentiometer 60. Both the initial voltage and the terminal voltage in the timing operation depend upon the setting of the potentiometer 60.

The rheostat 90 has a slider 140 and is preferably provided with a direct reading calibrated digital dial for adjusting the position of the slider 140. Suitable dials of this kind are obtainable from Borg Equipment Division, Amphonol-Borg Electronics Corp., under the designation "Borg Microdial." The dial may be used to read in seconds and hundredths of seconds of time, for example from zero to ten seconds. In order to provide values of time delay in the timer unit to match the dial readings, a nominal capacitance value may be assigned to the capacitor 30 and a nominal resistance value to the rheostat 90. Components manufactured to have these nominal values within suitable manufacturing tolerances may then be used in the unit, each component being interchangeable with others of the same nominal value. In accordance with the invention, the actual time delay interval may be adjusted to the desired value, for example, by varying the setting of the potentiometer 60 for timer 20. For example, using components of suitable nominal value to give a ten second delay interval, the slider 140 should be set at the dial reading labeled ten seconds and the potentiometer 60 should be adjusted until measurements made in known manner show the actual time delay interval to be ten seconds within the desired degree of precision. In general, the variation of time delay over the range of the rheostat 90 will be substantially linear so that when a calibration is made at one dail reading, preferably with the slider 140 set for maximum resistance, the values at the other dial readings will be correct.

The method of calibration described above is applicable to each of the units in a multi-unit system such as the type illustrated in FIG. 1. All the units may have the same maximum time delay and use the same nominal values of timing capacitance and time resistance, in which case different time delays may be selected by setting the several rheostats to different dial readings. On the other hand, some or all of the units may have different maximum time delays, using appropriately different nominal values of timing capacitance, timing resistance, or both. Thus, any desired degree of interchangeability of units may be achieved.

It will be evident that a single timer unit such as timer 20 may be used alone, for example to time a single operation, such as a spot weld. Also, two or more units may be provided in a set, in which case either the units may be used independently of each other to time a variety of different operations, or the units may be arranged to operate successively according to a given program, the completion of one time delay period being used to trigger the start of the next time delay period in known manner.

To illustrate a very simple control sequence, a starting circuit is shown in FIG. 1 wherein a start button 150 is connected in series with a control relay winding 100 across between the alternating current supply lines 42, 44. The winding 100 is assumed to operate the control relay contacts 101, 102, 103 shown in unit 20. The winding 200 is assumed to operate the control relay contacts 201, 202, 203, 204 and 205 shown in unit 25. The winding 100 is arranged to actuate normally open control relay contacts 102, 103, 104 and normally closed control relay contact 101. The control relay winding 200 is shown connected in series with the anode circuit of the thyratron 110. The winding 200 is arranged to actuate normally open control relay contacts 202, 203, 204, 207 and normally closed control relay contacts 201, 205, 206. The control relay winding 300 is shown connected in series with the anode circuit of the thyratron 115. The winding 300 is arranged to actuate a normally closed control relay contact 301. In addition to the control relay contacts above enumerated, windings 100, 200 and 300 will each actuate contacts for the purpose of controlling switching devices which are to be timed by the respective timing units 20, 25. For example, in FIG. 1, an additional contactor 210 is shown which is actuated by the winding 200 to control the connection of a power source such as a battery 212 to a utilization circuit 214. Also, an additional contactor 310 is shown which is actuated by the winding 300 to control the connection of a source such as a battery 312 to a utilization circuit 314.

In the operation of the above described control system, pressing of the start button 150 completes an alternating current circuit through the winding 100, thereby closing contacts 102, 103, 104 and opening contact 101. The closing of contact 104 locks the winding 100 in energized condition through normally closed contact 206 of de-energized winding 200. The operation of the remaining contacts controlled by winding 100 starts the timing operation in unit 20. When that unit has timed out, winding 200 is energized, connecting battery 212 to utilization circuit 214, and also opening contact 206 and de-energizing winding 100, allowing unit 20 to begin resetting. The closing of contact 207 has however locked winding 200 in energized condition through normally closed contact 301 of de-energized winding 300. Closing of contacts 202, 203 and 204, together with opening of contacts 201 and 205, starts the timing operation in unit 25, starting with resistor 85 in circuit to determine the initial value of the voltage impressed upon the timing circuit. When unit 25 has timed out, winding 300 is energized, connecting battery 312 to utilization circuit 314, and also opening contact 301 and de-energizing winding 200, allowing unit 25 to begin resetting. The consequent opening of contact 204 and closing of contact 205 enables the unit 25 to time its resetting operation using resistor 85' instead of resistor 85, so that, if desired, the resetting time may be made independent of the value of resistor 85 used to determine the starting voltage in the timing operation. Otherwise, resistor 85 may be retained permanently in circuit and contactors 204 and 205 need not be used. Upon completion of resetting in unit 25, the sequence may be repeated.

It is seen that, due to being actuated by the hand start button 150 of FIGURE 1 of the drawings, the operation is started whereby the relay coil 100 is energized and whereby other circuits including the circuit of the unit 20 are set in operation. The utilization circuit 214, however, remains open and inactive. The unit 20 operates throughout an uninterrupted, calibrated period, e.g. ten seconds, whereupon it causes the winding 200 to close the open utilization circuit 214 so that the circuit is set in operation in series with the power source 212, and the unit 20 keeps that circuit 214 in operation so long as the device 110 continues to conduct. Thus, the device 20 causes the utilization circuit 214 to delay ten seconds before its operation, which operation could consist of stopping a previously initiated ten-second operation or which operation could initiate some other operation after such ten-second delay.

The unit 25 has a timing circuit which controls the contact-controlling winding 300 and, first, leaves the switch 301 closed and the circuit of unit 20 in operation following closure of switch 207 and, second, keeps the circuit of unit 20 in operation for as long as the device 110 conducts, up to an uninterrupted calibrated period, e.g. ten seconds, and, third, times out so as to cause the switch 301 to re-open the circuit of unit 20 precisely when the calibrated period, e.g. ten seconds, expires.

While illustrative forms of apparatus and methods in accordance with the invenion have been descrbed and shown herein, it will be understood that numerous changes can be made without departing from the general principles and scope of the invention.

What is claimed is:

In electrical time measuring apparatus, in combination, a power supply means, a resistive network comprising a voltage divider connected across said power supply and having an output, a timing capacitor, a timing resistor, a switching means interconnecting said resistive network, timing capacitor and timing resistor, said switching means having a reset condition and a timing condition, said resistive network including an adjustable resistor for varying the voltage appearing at said output, said switching means when in said reset condition connecting said capacitor to said output for charging to a first potential, said switching means when in said timing condition connecting said resistor and capacitor in a series circuit across the output of said resistive network such that the capacitor may first discharge and then be charged toward a second potential of the reverse polarity of said first potential, said switching means in said timing condition connecting the elements of said resistive network in an arrangement different from that of said reset condition such that the second potential is different in magnitude from said first potential, means to start a measured time interval by switching said switching means from said reset condition to said timing condition, and responsive means connected across said capacitor and responsive to a predetermined voltage on said capacitor to determine the end of the measured time interval.

References Cited

UNITED STATES PATENTS

| | | | |
|---|---|---|---|
| 2,779,918 | 1/1957 | Altieri et al. | 324—63 |
| 2,950,422 | 8/1960 | Purkhiser | 317—142 |
| 2,965,815 | 12/1960 | Diepeveen | 317—142 |
| 3,209,211 | 9/1965 | DuVivier | 317—142 |

MILTON O. HIRSHFIELD, *Primary Examiner.*

LEE T. HIX, *Examiner.*

D. YUSKO, J. A. SILVERMAN, *Assistant Examiners.*